(12) United States Patent
Baumann et al.

(10) Patent No.: US 7,993,532 B2
(45) Date of Patent: Aug. 9, 2011

(54) METHOD OF FILTRATION USING CLOTH MEDIA AND SELF-ALIGNING BACKWASH ASSEMBLY

(75) Inventors: Peter G. Baumann, Roscoe, IL (US); Lloyd W. Johnson, Roscoe, IL (US); David Smith, Beloit, WI (US); Eugen O. Bergmann, St. George, UT (US)

(73) Assignee: Aqua-Aerobic Systems, Inc., Rockford, Loves Park, IL (US)

( * ) Notice: Subject to any disclaimer, the term of this patent is extended or adjusted under 35 U.S.C. 154(b) by 0 days.

(21) Appl. No.: 13/007,749

(22) Filed: Jan. 17, 2011

(65) Prior Publication Data

US 2011/0108496 A1 May 12, 2011

Related U.S. Application Data

(63) Continuation of application No. 11/086,193, filed on Mar. 22, 2005, now Pat. No. 7,892,421, which is a continuation-in-part of application No. 10/455,748, filed on Jun. 5, 2003.

(51) Int. Cl.
*B01D 29/68* (2006.01)
(52) U.S. Cl. .................................................. 210/791
(58) Field of Classification Search .................. 210/791, 210/797–798
See application file for complete search history.

(56) References Cited

U.S. PATENT DOCUMENTS
4,428,838 A * 1/1984 Creps et al. ................. 210/323.2

FOREIGN PATENT DOCUMENTS
EP           498037 A1 *  8/1992

* cited by examiner

*Primary Examiner* — Terry Cecil
(74) *Attorney, Agent, or Firm* — Niro, Haller & Niro

(57) ABSTRACT

The present inventions relate to water and wastewater treatment devices including stationary cloth filter media support structures forming effluent plenums for the filtered influent and self-aligning backwash assemblies for efficient periodic cleaning of the cloth filter media.

4 Claims, 15 Drawing Sheets

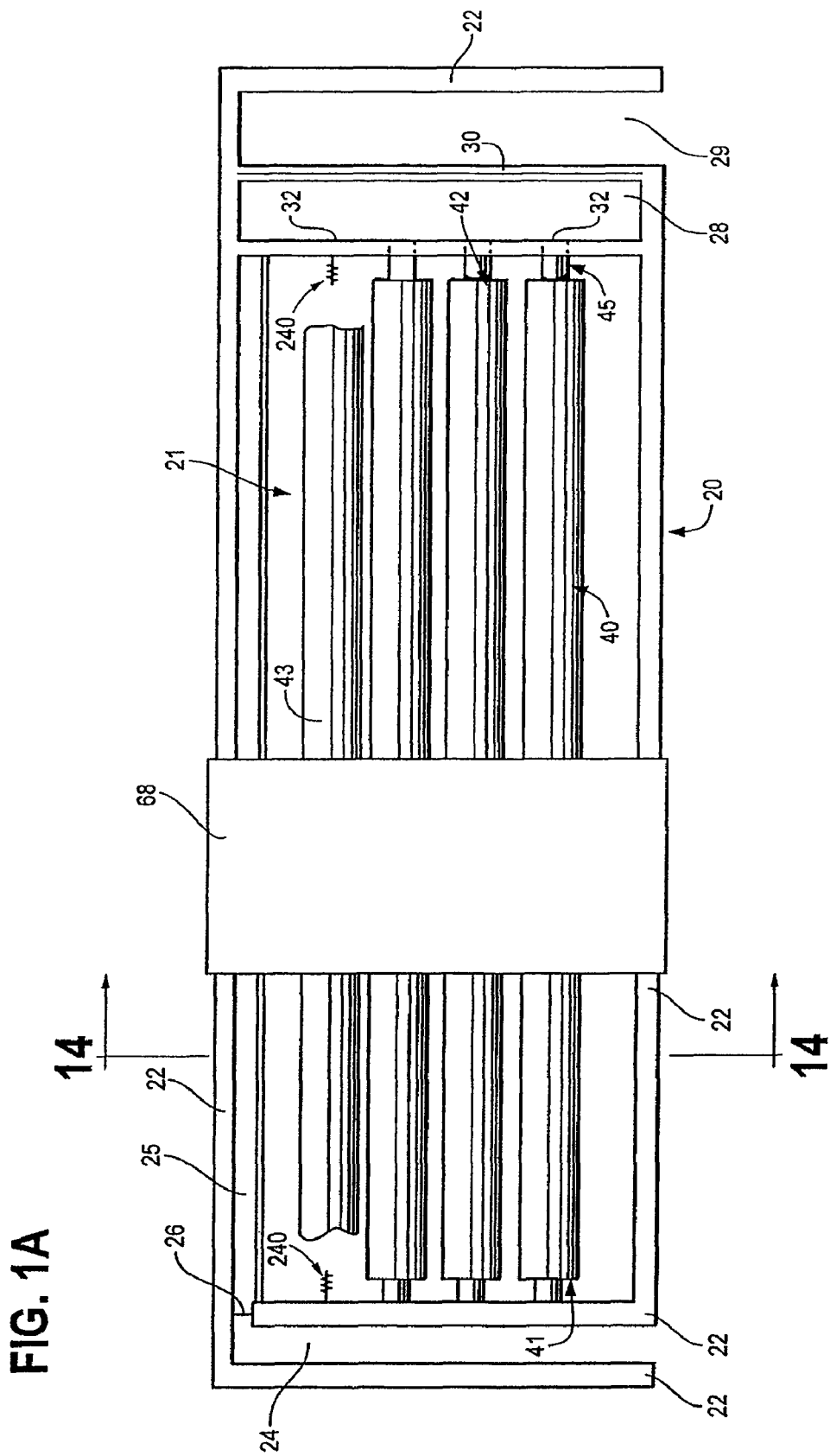

ARMS ENGAGED
(R)

ARMS DISENGAGED
(L)

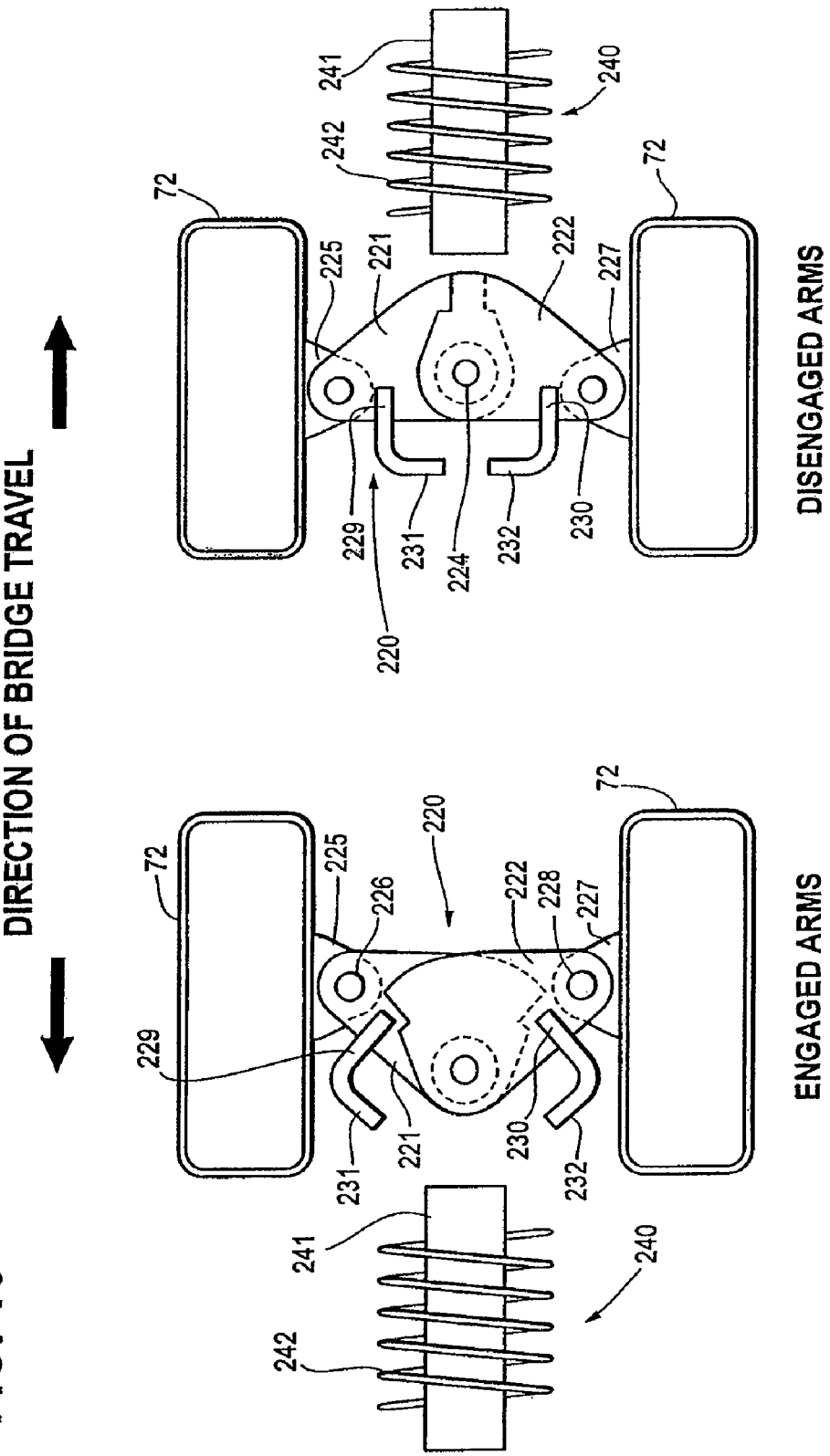

METHOD OF FILTRATION USING CLOTH MEDIA AND SELF-ALIGNING BACKWASH ASSEMBLY

RELATED APPLICATIONS

This application is a continuation of U.S. application Ser. No. 11/086,193, filed on Mar. 22, 2005, now U.S. Pat. No. 7,892,421; which is a continuation-in-part of U.S. application Ser. No. 10/455,748, filed on Jun. 5, 2003, now; all of which are incorporated herein by reference.

FIELD OF THE INVENTIONS

The present inventions relate generally to water and wastewater treatment processes and devices. More particularly, the present inventions relate to stationary cloth media filtration having a cloth media support structure which forms the effluent plenum for the discharge of filtered influent. In addition, the present inventions relate to cloth filter media backwash systems. And, more particularly, the present inventions relate to self-aligning backwash assemblies having the ability to compensate for deviations or tolerances associated with the construction and installation of filtration systems and their components.

BACKGROUND OF THE INVENTIONS

There are a variety of cloth media filtration systems available for water and wastewater treatment. However, these systems have rotating frame assemblies supporting the cloth filter media and/or require separate effluent channels for effluent discharge.

For example, available disk filtration systems generally have a tank with an inlet and outlet and a rotatable filter frame assembly positioned between the inlet and outlet. Cloth filter media is stretched over disk type frame sections which are connected to a rotatable support structure, such as a center tube pipe. During filtration, influent flows into the tank and passes through the cloth filter media, through the hollow disk frame section and into the effluent center tube for discharge through the tank outlet. See, for example, U.S. Pat. No. 4,639,315. The cloth filter media is periodically cleaned by a variety of procedures, such as backwashing and/or high pressure spray while the disks are rotating. See, for example, U.S. Pat. Nos. 5,374,360, 5,876,612 and 6,090,298.

Similarly, another cloth media filtration system is generally referred to as drum filtration. In drum filtration systems, cloth filter media is stretched over support frames that form a large drum shape, as opposed to disks. The drums are attached to a center tube structure and together form a rotatable filter frame assembly. During filtration, influent flows into the tank and passes through the cloth filter media, depositing the suspended solids on the cloth. The filtered influent flows through the filter frame center tube and is discharged through the tank outlet. See, for example, U.S. Pat. No. 4,090,965. Like disk filtration, the cloth filter media is periodically cleaned while rotating by backwashing and the like.

A more recent development in cloth media filtration is stationary cloth media filtration systems invented by some of the same co-inventors as the present inventions and assigned to Aqua-Aerobic Systems, Inc. This development is shown and described in U.S. Pat. No. 6,858,140, which issued on Feb. 22, 2005, and is entitled "Process and Devices for Water and Wastewater Treatment Including Stationary Cloth Media Filtration. In general, this system includes one or more distinct sealed effluent plenums. A series of cloth filter media covered filter plates are attached to and in fluid communication with the effluent plenums. Influent flows into the filtration basin through influent plenums and passes through the hollow cloth filter media covered filter plates. The filtered influent is then discharged through the effluent plenums. The cloth filter media is periodically cleaned, typically by backwashing, using a traveling bridge type assembly and the like.

While the above described systems are effective for a variety of applications, there are some inherent limitations for other applications. For example, the rotating disk and drum cloth media filtration systems are limited in capacity because of the necessity for rotation of the assembly during filtration and cleaning, which limits the length of the assemblies. To increase their length and capacity, it is believed that intermediate supports, larger pumps and more backwash equipment would be required. In addition, such systems necessarily have at least one rotating seal that is a potential area for failure and contamination by infiltration of untreated influent. These systems also require motors and related equipment necessary to impart rotation to the assemblies.

The stationary cloth filter media discussed in U.S. Pat. No. 6,858,140 is also effective for certain types of applications. However, this system requires, among other things, separate effluent plenums and a series of cloth media filter plates attached to the effluent plenums. As such, a large number of seals (for example, between each filter plate where it is attached to the effluent plenums) are required, again, posing potential contamination problems.

In addition, in order to effectively and efficiently conduct the backwashing operation of stationary cloth filter media filtration systems, it is important that the backwash shoes maintain sufficient contact with the cloth filter media during the backwashing operation. This operation is complicated by the fact that in most typical installations, there are manufacturing and construction tolerances in the various components, materials and in their spatial relationship to one another. Thus, there is a need for improved traversing backwash systems to accommodate for such tolerances.

SUMMARY OF THE INVENTION

The present inventions preserve the advantages of known water and wastewater treatment filtration systems and devices and provide new features, advantages and benefits over these systems. In addition, the present inventions preserve the advantages of known systems and devices that may be used in and/or are associated with these systems and provide new features, advantages and benefits.

In a preferred embodiment of the present invention, a cloth media filtration system is provided for the treatment of water and wastewater having a stationary cloth filter media support structure that also forms the effluent plenum for the discharge of filtered influent. Cloth filter media, preferably, but not limited to, a one piece sock, is attached to the hollow cloth media support structure to filter the effluent passing through it. A traversing backwash system may also be provided to enable the periodic cleaning of the cloth filter media. The cross-sectional shape of the stationary support structure is preferably a diamond or hexagon, but other cross-sectional shapes may also be employed, depending upon such things as system requirements and the like.

Also in a preferred embodiment of the present invention, a cloth media filtration device is provided having at least one stationary cloth media support structure having a length, a cross-sectional shape and two ends. One end of the support structure is sealed and the other end of the support structure is open to and in fluid communication with an outlet of a treatment basin. The support structure supports the cloth filter media and also forms the effluent plenum for the discharge of filtered effluent. The cross-sectional shape of the support structure may be a variety of shapes and the cloth filter media is preferably a one piece sock, but may also be attached in sections or otherwise as known in the art. A traversing backwash system to clean the cloth filter media and a control system to control the filtering and backwash operations may also be provided.

The present inventions also provide a cloth media filtration device for supporting cloth filter media having at least one elongated cloth media support structure for placement in a water or wastewater treatment basin that remains stationary during filtration and which forms the effluent plenum for the discharge of filtered influent. Traversing backwash and control systems may also be provided.

A preferred method for filtering an influent of water or wastewater in a treatment basin and discharging the filtered influent through an effluent plenum is also provided, which includes the steps of introducing influent for treatment into a treatment basin, filtering the influent through cloth filter media supported on a stationary cloth media support structure and discharging the filtered influent through an effluent plenum formed by the stationary cloth media support structure. The methods may also include traversing backwash systems and control systems.

The present inventions further provide a cloth filter media filtration system for the treatment of water or wastewater in a treatment basin having stationary cloth filter media support means to support cloth filter media and also for forming effluent means for the discharge of filtered influent from the treatment basin. Traversing backwash means for periodically cleaning the cloth filter media is also provided. The cloth filter media support means may have a variety of cross-sectional shapes, and control means may also be provided.

The present inventions also provide for self-aligning backwash assemblies that are part of traversing backwash systems. A self-aligning backwash assembly may include a hinged rocker cage that supports and balances two sets of opposing pairs of cooperating backwash support arms and their associated backwash shoes which permits the backwash assembly to float vertically to compensate for deviations in the relative position of the effluent plenums to the treatment basin, the traversing bridge system as well as the horizontal length of the cloth media support structures and effluent plenums.

In a preferred embodiment of the present inventions, a cloth media filtration system for treating water or wastewater in a treatment basin having influent and effluent channels is provided having a stationary cloth filter media support structure forming an effluent plenum and positioned in the basin, a cloth filter media attached to and supported by the support structure, and a traversing backwash system including a self-aligning backwash assembly for periodically cleaning the cloth filter media. The self-aligning backwash assembly includes a hinged rocker cage and a rotating cam mechanism to enable or disable the backwashing operation of a particular pair of associated support arms.

The present inventions also provide a self-aligning backwash assembly for periodically cleaning at least one pair of stationary cloth media support structures placed within a treatment basin having a length, a cross-sectional shape and at least one open end in fluid communication with an outlet, wherein the support structure supports the cloth filter media. The self-aligning backwash assembly includes a hinged rocker cage pivotably mounted to a support structure of a traversing backwash assembly, two pairs of opposing support arms pivotably mounted to the hinged rocker cage, a cam mechanism associated with each pair of opposing support arms, and a plunger mechanism associated with each of the cam mechanisms to permit engagement of the support arms in a backwashing position and to permit disengagement of the pair of opposing support arms in a non-backwashing position. A plunger mechanism (which may be spring loaded) to engage or disengage the associated pair of support arms via the cam mechanism may also be provided.

A cloth media filtration device for supporting cloth filter media, having at least one pair of elongated cloth media support structures for placement in a treatment basin that remain stationary during filtering and which form an effluent plenum for the discharge of filtered influent, and a traversing backwash system having a self-aligning backwash assembly for periodically cleaning the cloth filter media supported on the support structure is also provided.

In addition, the present inventions further provide for cloth filter media filtration systems for the treatment of water or wastewater in a treatment basin having stationary cloth filter media support means to support cloth filter media and also for forming effluent means for the discharge of filtered influent, and traversing backwash means for periodically cleaning the cloth filter media, including self-aligning backwash means to compensate for deviations in the construction, installation and materials of such filtration systems. Control means for regulating the traversing backwash means may also be provided.

Accordingly, it is an object of the present invention to provide processes and devices for the treatment of water or wastewater using cloth filter media that is supported by a stationary cloth media support structure that also forms the effluent plenum for the discharge of filtered influent.

Another object of the present invention is to provide methods and devices for stationary cloth media filtration wherein the cloth media support structure forms the effluent plenum for the filtered influent and which may be retrofitted into existing treatment basins, designed for new installations or as a stand alone tank unit.

An additional object of the present invention is to provide cloth media filtration that reduces the number of seals and/or eliminates the need for moving or rotating seals to isolate the untreated influent from the treated effluent and prevent contamination of the effluent.

Still another object of the present inventions is to provide processes and devices for stationary cloth media water and wastewater treatment that eliminate the need for traditional granular media associated with standard sand or other granular media filtration systems.

Still yet another object of the present inventions is to eliminate the equipment required to impart rotation to rotating cloth filter media systems.

Still an additional object of the present inventions is to provide increased water or wastewater filtration capacity without increasing the treatment basin footprint.

Still yet an additional object of the present inventions is to provide increased flexibility in filtration capacity by changing the cross-sectional shape of the stationary cloth filter media support structure depending upon application or design requirements.

Yet a further object of the present inventions is to provide a self-aligning backwash assembly that is capable of compensating for deviations or tolerances of the various components of the filtration systems and their installation.

Still a further object of the present inventions is to provide self-aligning backwash assemblies that permit improved contact between the backwash shoes and the cloth filter media during the backwash operation, and also permit adequate clearance between the backwash shoes and the cloth filter media when not conducting the backwash operation.

And still an additional object of the present inventions is to provide methods and devices for stationary cloth media filtration that include self-aligning backwash assemblies.

And still yet a further object of the present invention is to provide improved backwashing devices that are capable of automatic operation through activation of rotating cam mechanisms by plunger assemblies mounted at the ends of the treatment basin.

A further object of the present invention is to provide water and wastewater filtration methods and devices, including backwashing assemblies and devices, that include one or more of the above stated or apparent aspects, features and advantages, alone or in combination, and also as may be set forth or become apparent.

DEFINITION OF THE TERMS

The following terms which may be used in the various claims of this patent are intended to have their broadest meaning consistent with the requirements of law:

Cloth filter media: Any permeable cloth-like material, including but not limited to natural or synthetic fiber or membrane compositions.

Treatment basin: The overall area devoted to the filtration process, including the area where filtration occurs, and which may also include associated chambers, conduits, channels and the like for the introduction of influent and ultimate discharge of treated effluent.

Cloth filter media support structure: The stationary assembly for placement within the treatment basin that supports the cloth filter media and which forms the effluent plenum through which filtered influent is discharged. The assembly may also be referred to as "support structure."

Traversing backwash system: The structural and mechanical assembly that carries the components necessary to conduct the backwash and other operations which is able to traverse the length of the cloth filter media support structure and associated cloth filter media. The system may include, but is not limited to, traveling bridge type assemblies and backwash shoes, submerged pulley activated assemblies and the like.

Control system: The structural, mechanical and electrical assembly that measures and controls water levels in the treatment basin, the influent and effluent levels, the operation of the filtration system, as well as the operation of the traversing backwash system and the like.

Effluent plenum: The effluent discharge formed by the cloth filter media support structure to discharge filtered influent from the treatment basin. Effluent plenum is used in the following specification and claims of this patent in a non-limiting fashion and as a shorthand way to distinguish the effluent discharge formed by the support structure of the present inventions from the effluent chambers, conduits, channels and the like used in relation to and/or are a part of a typical treatment basin or tank.

Self-aligning backwash assembly: The components which are part of the traversing backwash system that are capable of compensating for basin construction, equipment installation and manufacturing or assembly tolerances or deviations of the filtration system components. The self-aligning backwash assembly includes the components of the traversing backwash system that are suspended from the bridge structure to conduct the selective backwash operation of two adjacent cloth filter media structures located within a treatment basin.

Preferably, the self-aligning backwash assembly may also include a hinged rocker cage and/or a cam mechanism.

Where alternative meanings are possible, in either the specification or claims, the broadest meaning is intended. All words used in the claims are intended to be used in the normal, customary usage of grammar and the English language.

BRIEF DESCRIPTION OF THE DRAWINGS

The above described objects, features and advantages, as well as other features and advantages, of the present inventions (sometimes used in the singular, but not excluding the plural) will become apparent by reference to the specification and drawings; wherein like reference numbers are used for like elements among the several views, and in which:

FIG. 1A is a schematic top plan view of a series of cloth filter media support structures shown situated in a typical water or wastewater treatment basin, and showing activation components of a preferred self-aligning backwash assembly of the present inventions, as well as a typical bridge support that travels between the left and right of the figure along the length of the basin.

FIG. 16 is a top schematic view of a preferred cam mechanism of the present inventions showing the control arms in engaged and disengaged positions along the axis of travel of the traversing backwash assembly and schematically showing a representative plunger activation assembly of the present inventions.

DETAILED DESCRIPTION OF PREFERRED EMBODIMENTS

Set forth below is a description of what is currently believed to be the preferred embodiments or best representative examples of the inventions claimed. Future and present alternatives and modifications to the preferred embodiments are contemplated. Any alternatives or modifications which make insubstantial changes in function, purpose, structure, use or result are intended to be covered by the claims of this patent.

Figure 1:
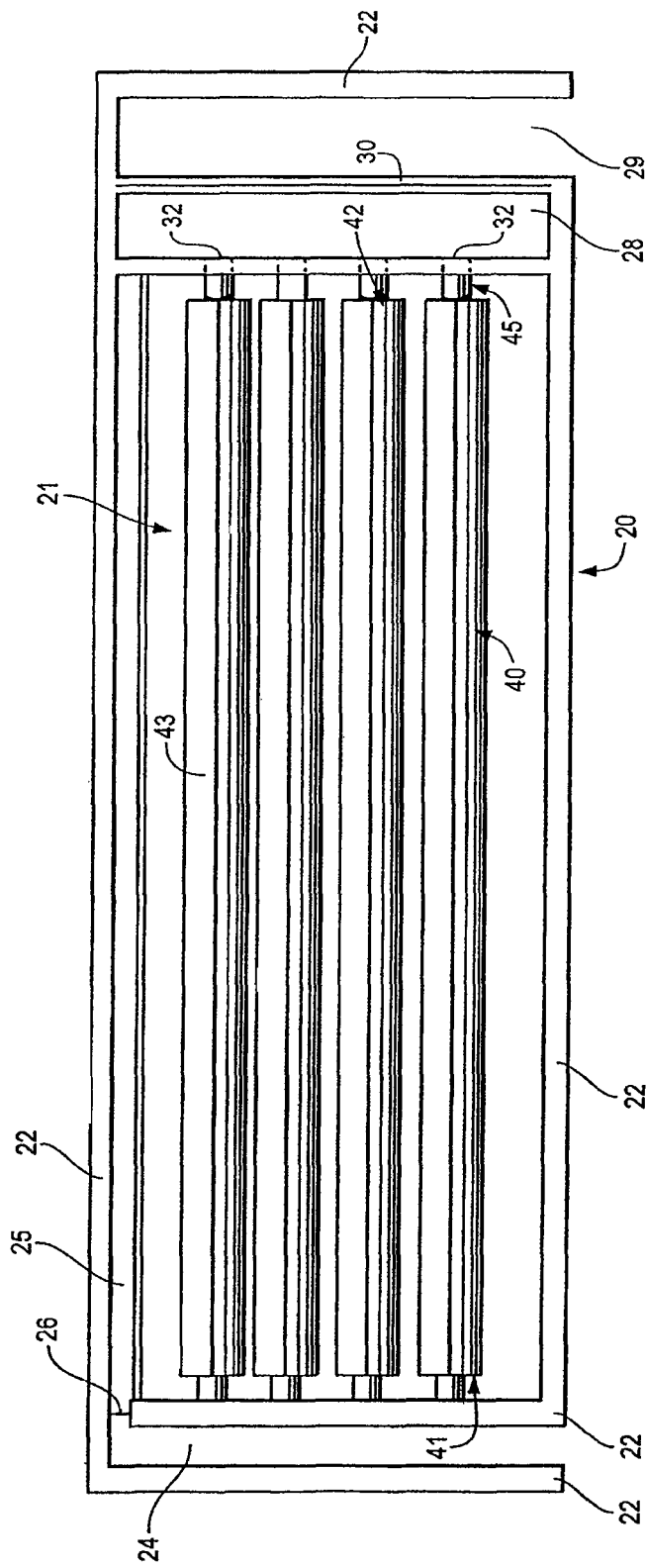
FIG. 1 is a schematic plan view of a series of cloth filter media support structures of the present invention shown situated in a typical water or wastewater treatment basin.
Figure 2:
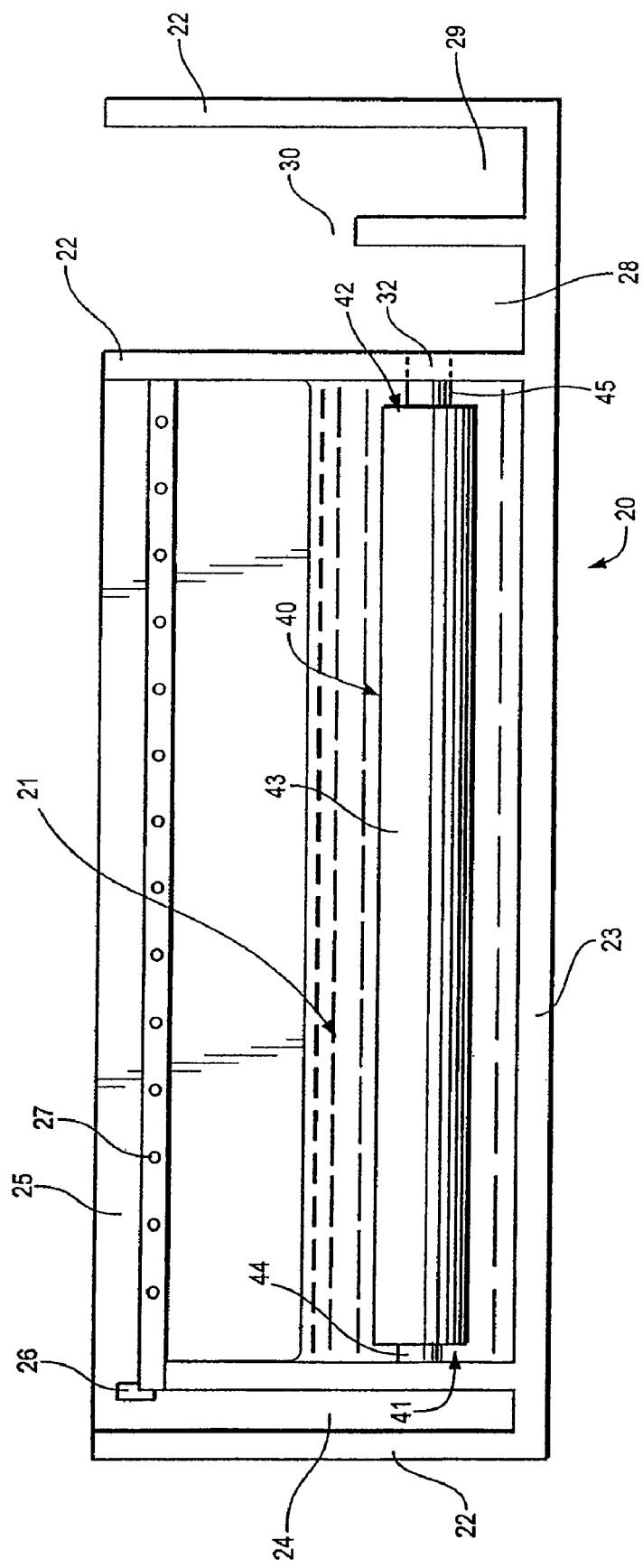
FIG. 2 is a schematic elevational view of the inventions of FIG. 1.

The system and devices of a typical embodiment of the present invention is shown generally as 20 in FIGS. 1 and 2. The present inventions, including the self-aligning backwash assemblies, may be designed to be retrofit into the footprint of an existing filtration basin to replace, for example, a typical granular media gravity filtration system. Modifications of the existing basin, as will be understood by those of ordinary skill in the art, may be required to conform the existing basin to accommodate the present inventions, such as the erection of dividing walls and the like. The present inventions may also be designed for a new installation or installed in a stand alone tank arrangement similar to conventional rotating disk filtration. For purposes of clarity, but not as any limitation, the present inventions will be discussed in relation to and/or as part of treatment basin 21, typically constructed from concrete or other suitable materials. The treatment basin 21 typically includes side walls 22 and a floor or bottom 23. A common influent chamber 24 may be provided which is in fluid communication with the influent channel 25 of the treatment basin. An influent weir 26 may also be provided to control the flow of influent water or wastewater to be treated. Influent flows along the influent channel 25 and into treatment basin 21 through holes 27 or other well known means. A typical treatment basin 21 also includes or may be provided with an effluent chamber 28 that is in fluid communication with an effluent channel 29 via an effluent weir 30 or other well known means of flow control.

The present inventions include a cloth filter media support structure 40 which supports cloth filter media 43 and remains stationary during both filtering and cleaning as hereinafter described. Cloth filter media support structure 40 has an open end 42 and may, as in a preferred embodiment, have a closed end 41. It is preferred, but not required, that cloth filter media 43 is formed from a one piece sock, the open end of which terminates and is sealed at the open end 42 of support structure 40. In a preferred embodiment, the closed end 41 of support structure 40 is secured to an end wall 22 or bottom 23 of treatment basin 21 by, for example, mounting brackets 44 or other suitable means. If present, closed end 41 may also be configured so that it may perform the filtering operation if desired. Alternatively, closed end 41 may be configured to form another open end to discharge filtered effluent (not shown). The open end 42 of support structure 40 is attached to an opposing wall 22 of treatment basin using pipes, coupling, flanges, brackets or the like as hereinafter described and shown generally as 45 in FIGS. 1 and 2. Open end 42 is in fluid communication with effluent outlet 32, which in turn is in fluid communication with effluent chamber 28.

Support structure 40 supports cloth filter media 43 so that, as hereinafter described, a hollow interior or effluent plenum 46 is formed (not shown in FIGS. 1 and 2) that permits influent to flow through the cloth filter media 43 and into effluent plenum 46 of support structure 40 to be discharged through open end 42 into effluent chamber 28 via effluent outlet 32. In this manner, cloth filter media support structure 40 both supports the cloth filter media 43 and forms an effluent plenum 46. During operation and backwashing, support structure 40 remains stationary and there are only two non-moving seals necessary in this embodiment at the open end 42 of the support structure 40 to prevent the infiltration of untreated influent into the effluent, as hereinafter described.

A preferred embodiment of a cloth filter media support structure 40 of the present invention may be seen in more detail by reference to FIGS. 3-8. Preferred support structure 40 has a generally diamond shape or any shape with a uniform cross-section as particularly shown in FIGS. 5 and 6. Support structure 40 may be constructed from a longitudinal top frame member 50 and a longitudinal bottom frame member 51 that may be fabricated by one or more pieces of stainless steel, aluminum, plastic or other suitable material. Longitudinal side frame members 52 and 53 may also be provided. A series of side support frame members 54 may be provided and spaced along the length of support structure 40. A cloth support screen 55 is then attached to the sides of the frame members 50, 51, 52 and 53. Support screen 55 supports the cloth filter media 43 and, along with support frame members 50, 51, 52, 53 and 54, forms a hollow interior or effluent plenum 46 through which influent passes, is filtered and discharged.

It will be understood by those of skill in the art that support structure 40 may be constructed and assembled in a variety of configurations consistent with the present inventions as disclosed, discussed and/or claimed in this patent. As one alternate example, separate top or bottom frame members 50 and 51 may not be required as sufficient support frame members may be integrated into the sides of the support structure 40. Other methods or means of creating support structure 40 will also be apparent to those of ordinary skill in the art.

Figure 4:
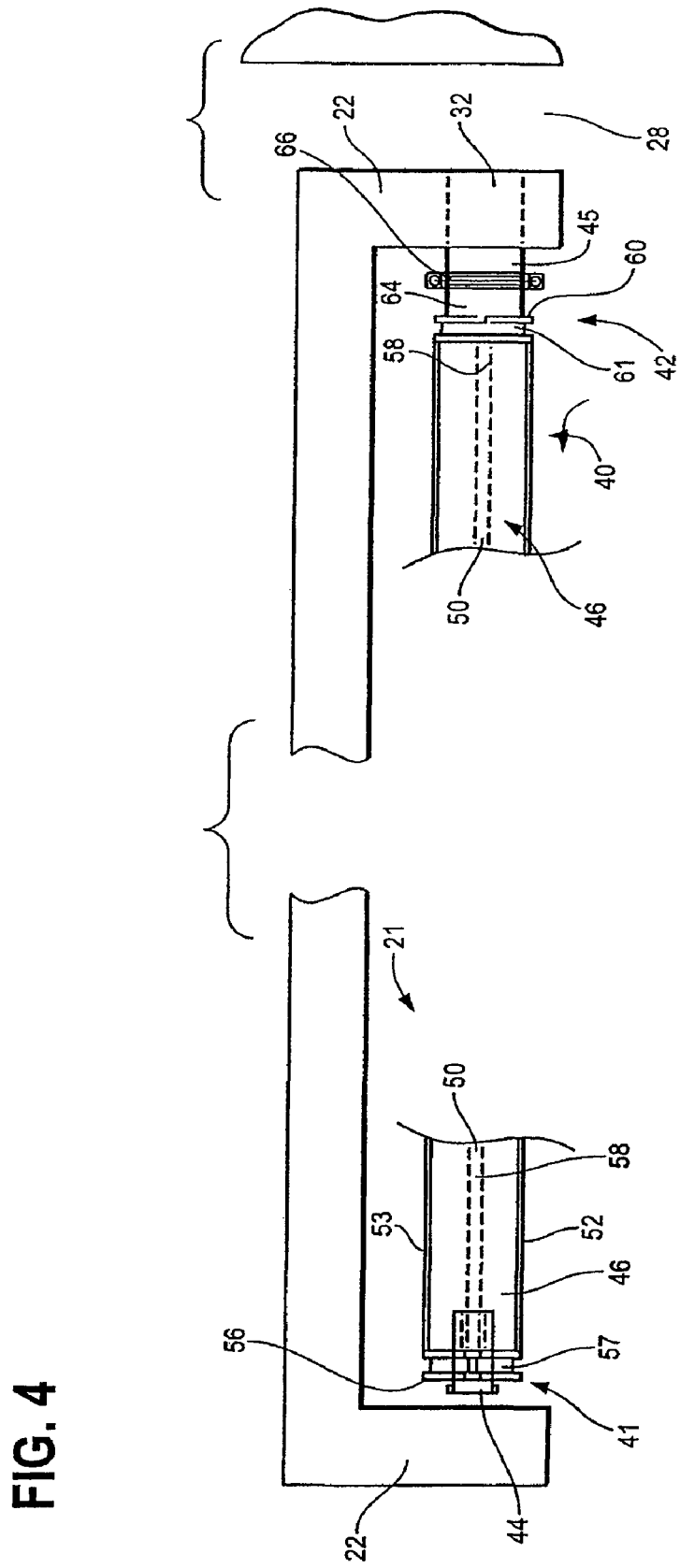
FIG. 4 is a top view of a preferred cloth filter media support structure showing details of each end of the embodiment installed in a typical treatment basin.
Figure 5:
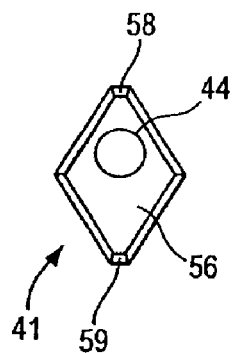
FIG. 5 is an end view of the closed end of the preferred support structure of FIG. 3 taken along line 5-5 of FIG. 3.
Figure 6:
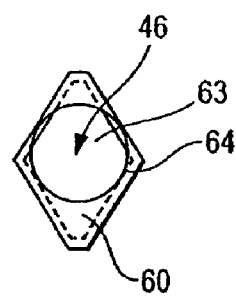
FIG. 6 is an end view of the open end of the preferred support structure of FIG. 3 taken along line 6-6 of FIG. 3.
Figure 7:
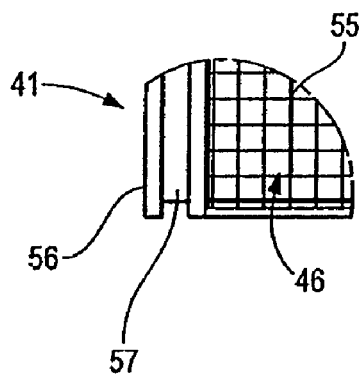
FIG. 7 is an enlarged side view showing additional details of the closed end of the preferred support structure of FIG. 3.
Figure 8:
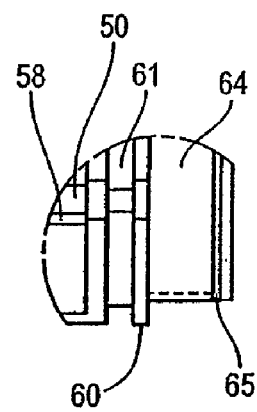
FIG. 8 is an enlarged side view showing additional details of the open end of the preferred support structure of FIG. 3.

An embodiment of a preferred closed end 41 of support structure 40 may be seen by reference to FIGS. 4, 5 and 7. A closed end plate 56, that coincides with the cross-sectional shape of support structure 40, is attached to longitudinal frame members 50, 51, 52 and 53 and is impervious to fluid flow. Mounting bracket 44 may be attached to or formed as part of closed end plate 56, although other mounting means may be readily employed. The closed end plate 56 may include channels 57 on the outer sides so that bars or bands (not shown) may be placed in and secured to the channels 57 after cloth filter media 43 is installed in order to help tension, seal and secure the cloth filter media 43 to the support structure 40. Similarly, top and bottom frame members 50 and 51 may also have outwardly facing channels 58 (top channel 58 shown in FIG. 4) into which bars or bands (not shown) may be secured after installation of cloth filter media 43 to help tension and secure the cloth filter media 43 to cloth filter media support structure 40.

An embodiment of open end 42 of support structure 40 may be seen in more detail by reference to FIGS. 3, 4, 6 and 8. An end plate 60 that coincides with the cross-sectional shape of support structure 40 is attached to longitudinal frame members 50, 51, 52 and 53. End plate 60 may also include side channels 61 into which corresponding bars or bands (not shown) may be placed in and secured to after cloth filter media 43 is installed to help tension, seal and secure the cloth filter media 43 to support structure 40. Attached to or formed as part of end plate 60 is an opening 63 which may be in the form of a circular pipe 64 or other well known shapes and means.

The distal end of pipe 64 may include a groove 65. To aid in the attachment of open end 42 to the effluent outlet 32, an effluent pipe 45 may be provided which is in fluid communication with effluent outlet 32 of treatment basin 21. Pipe 45 is typically the same size as circular pipe 64 of open end 42. In a preferred embodiment, circular pipe 64 is attached to pipe 45 through the use of a ring coupling 66 that engages groove 65 and connects distal end 64 to pipe 45 in order to provide a water tight seal. Other methods may include flanges, threads and/or sleeves, as will be understood by those in the art.

In operation of the preferred embodiment of the present invention 20, untreated influent flows into common influent chamber 24 and is introduced into influent channel 25 via influent weir 26. The influent is distributed into treatment basin 21 through holes 27 or other well known means on influent channel 25. Once in the treatment basin 21, the influent flows through and is filtered by cloth filter media 43 that is attached to and/or supported by stationary cloth filter media support structure 40. The filtered influent flows through the effluent plenum 46 formed by support structure 40, through open end 42 and circular pipe 64, into pipe 45, through outlet 32 and into effluent chamber 28 for ultimate discharge.

It has been determined that when the present inventions are retrofit into standard width treatment basins, a series of cloth filter media support structures is preferred. For example, in a standard nine foot wide basin, four support structures 40 may be used; in a twelve and one-half foot basin, six support structures may be used; and, in a sixteen foot basin, eight support structures 40 may be used. However, the number and spacing of support structures 40 is determined based upon flow, capacity and other design considerations, as will be understood by those of skill in the art.

Figure 12:
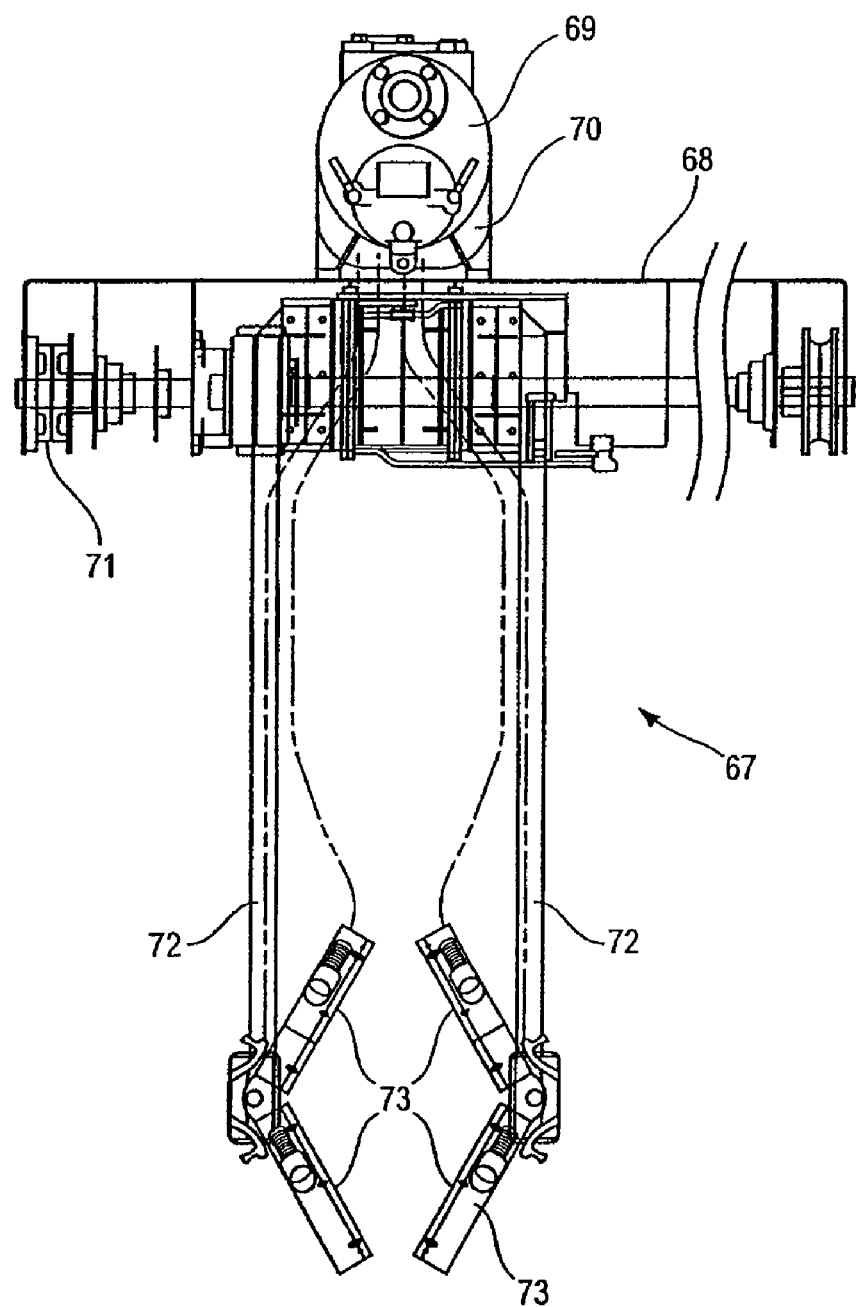
FIG. 12 is an end view of a preferred embodiment of the principal components of a traversing backwash system of the present invention.
Figure 13:
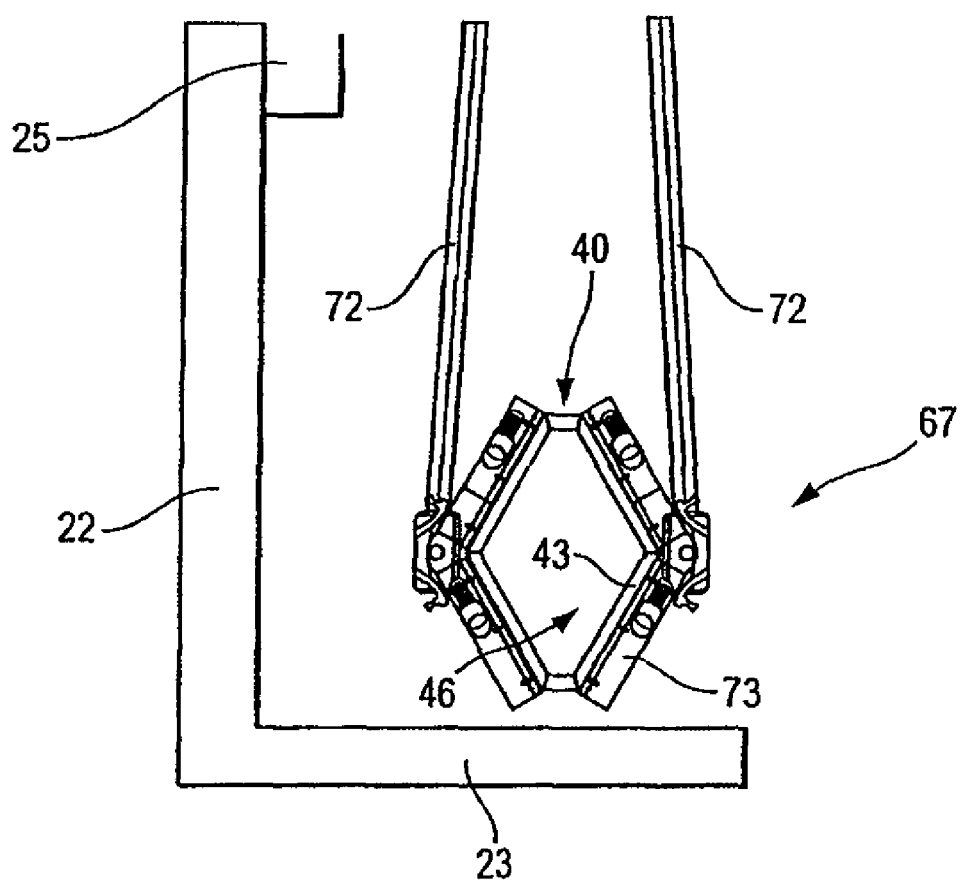
FIG. 13 is an end view of a preferred traversing backwash system of the present invention showing typical backwash shoes engaged with the cloth filter media covered support structure of the present invention.

Periodic cleaning of the cloth filter media 43 may be accomplished by a traversing backwash system shown generally as 67 in FIGS. 12 and 13. An embodiment of the traversing backwash system 67 may be similar to a typical traveling bridge type assembly that includes the bridge structure 68 that supports motors 69, pumps 70 and wheels 71 that enable movement of the system 67 along the axis of the plenum 46 and over the cloth filter media 43. Support arms 72 are also provided and supported by bridge structure 68. Support arms 72 carry backwash shoes 73 that are used to clean the cloth filter media 43. Although not discussed in detail herein, hoses, wires and other necessary electrical, mechanical and structural components are provided to enable the backwash operation via backwash shoes 73, as will be understood by those of skill in the art.

In one embodiment, backwash shoes 73 are spring biased to properly engage support structure 40 as shown in FIG. 13. The number, spacing and configuration of the backwash shoes depends upon the cross-sectional shape of the cloth filter media support structure 40 (see e.g., FIGS. 1A and 2A).

When backwashing is desired, bridge structure 68 rides along the top of treatment basin 21 and along the axis of the support structure 40. The backwash system 67 may also run mid-depth or under support structure 40, depending upon the particular embodiment. Suction applied to backwash shoes 73 clean filter media 43 as the assembly 67 traverses the length of the basin and the length of stationary cloth filter media support structure 40. As will be understood by those of skill in the art, a control system is typically provided to regulate the backwash, filtering and other operations.

Figure 9:
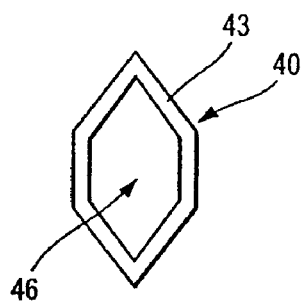
FIG. 9 is a schematic sectional view of an alternative cross-sectional shape of the cloth filter media support structure.
Figure 10:
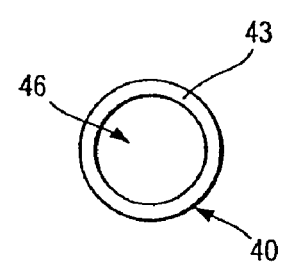
FIG. 10 is a schematic cross-sectional view of an alternative cross-sectional shape of the cloth filter media support structure.
Figure 10A:
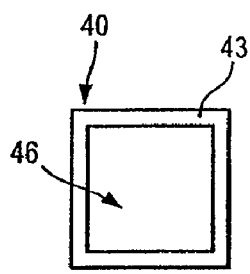
FIG. 10A is a schematic cross-sectional view of an alternative cross-sectional shape of the cloth filter media support structure.
Figure 10B:
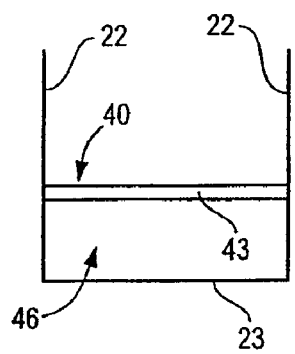
FIG. 10B is a schematic cross-sectional view of an alternative embodiment of a cloth filter media support structure of the present invention having a flat cross-section and situated over the floor of a treatment basin.
Figure 11:
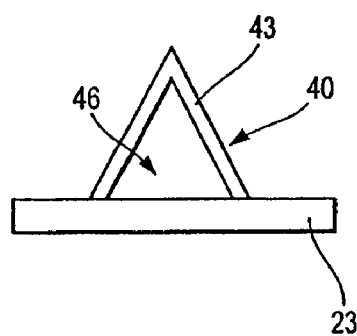
FIG. 11 is a schematic view of an alternative cross-sectional shape of the cloth media support structure, the support structure shown adjacent to the floor of a treatment basin.

Other specified and unspecified embodiments may also be used to practice the present inventions. For example, different cross-sectional shapes of support structure 40 may be readily employed, including but not limited to, the hexagonal, circular and square cross-sectional shapes shown in FIGS. 9, 10 and 10A. And, although a one piece sock cloth filter media 43 is preferred, separate sections and/or pieces may also be used. In addition, as shown in FIG. 11, the support structure 40 may be placed on and/or secured to the bottom 23 of the treatment basin, potentially using floor 23 to form part of effluent plenum 46, and may also have a variety of cross-sectional shapes. Similarly, as shown in FIG. 10B, support structure 40 may be flat and create an effluent plenum 46 incorporating the sides 22 and bottom 23 of treatment basin 21.

In addition, alternative traversing backwash systems are also contemplated. For example, backwash shoes 73 (and their related components for performing backwashing operation) may be submerged in treatment basin 21 and pushed or pulled along support structure 40 by cables, pulley and the like (not shown).

As previously indicated, the traversing backwash system 67 cleans the cloth filter media 43 during backwashing by drawing clean water backwards from the effluent plenums 46 through the cloth filter media 43 through backwash shoes 73 which are carried by support arms 72. Support arms 72 are attached to bridge structure 68 of traversing backwash system 67. In order to provide effective periodic cleaning of the cloth filter media 43, it is desirable to maintain consistent contact or contact pressure between backwash shoes 73 and cloth filter media 43. Because of deviations and/or tolerances inherent in the construction of cloth media filtration systems 20, treatment basin 21, traversing backwash system 67 and the materials themselves, it is advantageous for the traveling backwash system 67 to be capable of compensating for deviations or tolerances in the horizontal, and vertical dimensions (i.e., self-alignment) in order to maintain effective contact between the backwash shoes 73 and the cloth filter media 43. In filtration methods of the present inventions, it is desirable to utilize a backwash assembly that is capable of compensating for these deviations or tolerances.

Accordingly, a preferred self-aligning backwash assembly of the present inventions is shown generally as 200 in FIGS. 1A, 2A and 14-16. For convenience, the self-aligning backwash assembly 200 is described in relation to a preferred embodiment of a cloth filter media support structure 40 having a generally diamond shape, as shown in FIGS. 1-8. In addition, a preferred embodiment is described in relation to a cloth media filtration system 20 having an even numbered series of parallel spaced cloth media support structures 40. For example, a typical cloth media filtration system 20 installation may have eight cloth media support structures 40 situated within a treatment basin 21. As a result, such a system 20 will typically include four pairs of cooperating self-aligning backwash assemblies 200. However, the self-aligning backwash assembly 200 may be applied to filtration systems 20 having any even number of cloth media support structures 40.

Figure 14:
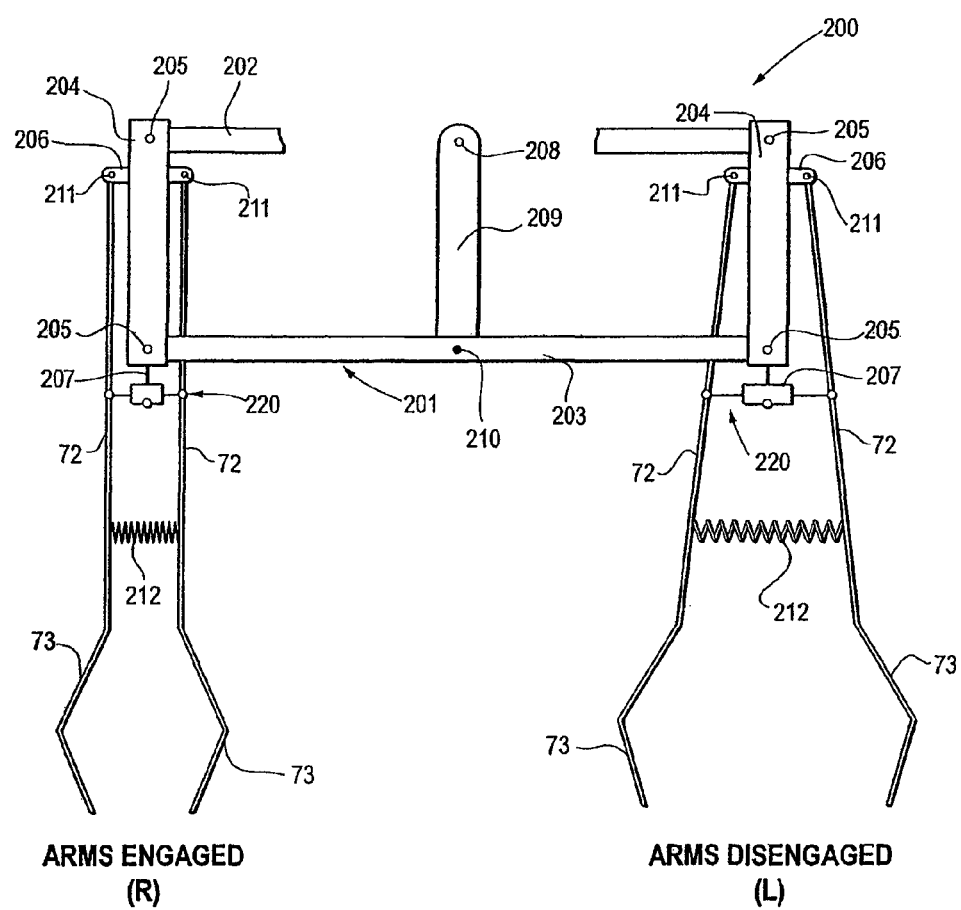
FIG. 14 is a schematic end view taken along line 14-14 of FIG. 1A of components of a preferred self-aligning backwash assembly of the present inventions showing one cooperative pair of assemblies.

A preferred example of one pair of cooperative self-aligning backwash assemblies 200 of a preferred traveling backwash system 67 having the ability to compensate for deviations in the vertical and horizontal dimensions are shown schematically in FIG. 14. As hereinafter described, the self-aligning backwash assembly 200 is mounted to and moveably supported by bridge structure 68 (see FIG. 2A).

A self-aligning backwash assembly 200 includes a hinged rocker cage 201. Hinged rocker cage 201 includes two spaced apart, parallel balance bars 202 and 203. Balance bars 202 and 203 are interconnected at each of their ends by a pair of vertical members 204. Each end of each balance bar 202 and 203 is pivotably connected to vertical members 204 by pins 205 or other well known means which forms pivot points as discussed herein. Preferably, hinged rocker cage 201 is fabricated from two pairs of components spaced apart from each other along the axis that is perpendicular to the plane formed by the sheet of paper of FIG. 14. For example, vertical members 204 may be fabricated from opposing pairs of box type structures shown in FIGS. 15B and 15C, or other shapes, such as bars, as will be understood by those of skill in the art. Suspended from vertical members 204 are guide stops 207 that are positioned to interact with components of cam mechanism 220.

Each vertical member 204 is adapted to mount a support arm linkage 206 that may be welded, integral with or otherwise secured to vertical members 204 through well known means. Hinged rocker cage 201 is then pivotably mounted to a fixed pivot 208 that is attached to or part of bridge structure 68 and which forms a pivot point. In a preferred embodiment, rocker cage 201 is suspended about fixed pivot 208 by a hanger 209. Hanger 209 is preferably pivotably connected to the lower balance bar 203 by a pin 210 or other well known means which forms a pivot point. As shown in FIG. 14, the pivotal connection of hanger 209 to lower balance bar 203 is in line with the pivot pins 205. Similarly, and as is consistent with four bar linkages, like hinged rocker cage 201, fixed pivot 208 is preferably in line with upper balance bar 202 and its associated pivot pins 205.

As will be understood by those of skill in the art, fixed pivot 208 may be extended from bridge structure 68 so that it is in line with pivot pins 205 and upper balance arm 202 while permitting rocking of hinged rocker cage 201 about an axis through fixed pivot 208. Although rocker cage 201 is preferably permitted to rotate about fixed pivot 208, rocker cage 201 moves along the longitudinal axis of cloth media support structure 40 as the traversing backwash system 67 travels the length of treatment basin 21 during the backwashing operation as hereinafter described.

Suspended from each support arm linkage 206 are cooperating pairs of opposing support arms 72 and their associated backwash shoes 73. Support arms 72 are pivotably mounted to each end of support arm linkage 206 with pins 211 or other well known pivot means forming a pivot point. Springs 212 are provided and are connected between each pair of cooperating support arms 72 through tabs or other means (not shown). Springs 212 tension the pair of support arms 72 into an engaged position (shown on the left in FIG. 14) when the backwashing operation is being conducted. The springs 212 are pushed open by rotating cam mechanism 220 as herein described when no backwashing is conducted and support arms 72 are locked in a disengaged position (shown on the right in FIG. 14). Springs 212 should provide sufficient tension between cooperating pairs of support arms 72 so that the associated backwash shoes 73 remain in adequate contact with cloth filter media 43 during backwashing. As will be understood by those of skill in the art, spring strength is a design consideration that is affected by, among other things, the horizontal orientation of spring 212, friction and the relative moment arms of cloth filter media 43 and spring 212 about fixed pivot 211 during bridge structure 68 travel.

Figure 15A:
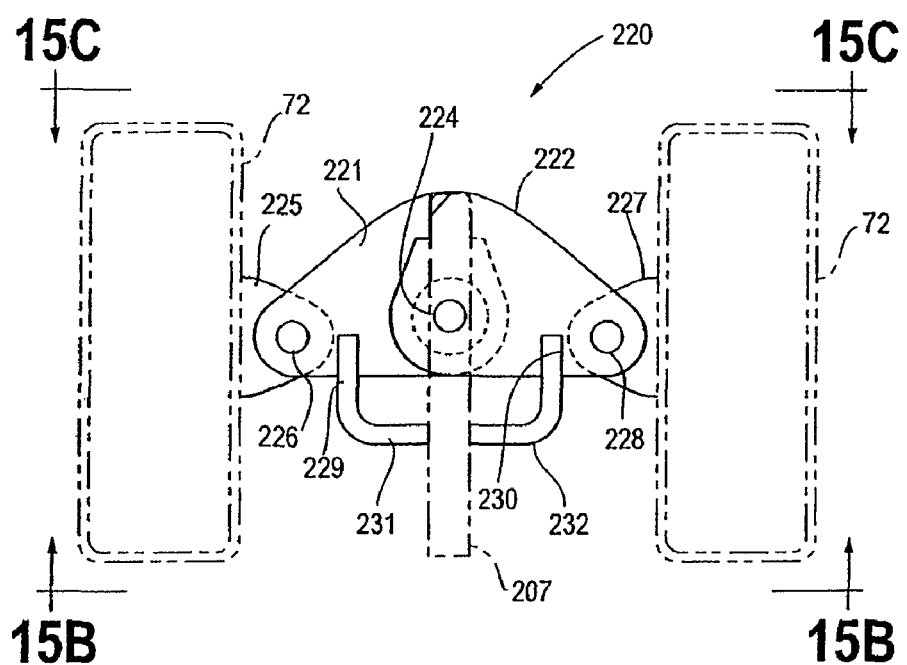
FIG. 15A is a top schematic view of a preferred cam mechanism of the present invention shown with a pair of support arms locked in a disengaged (non-backwashing) position.
Figure 15B:
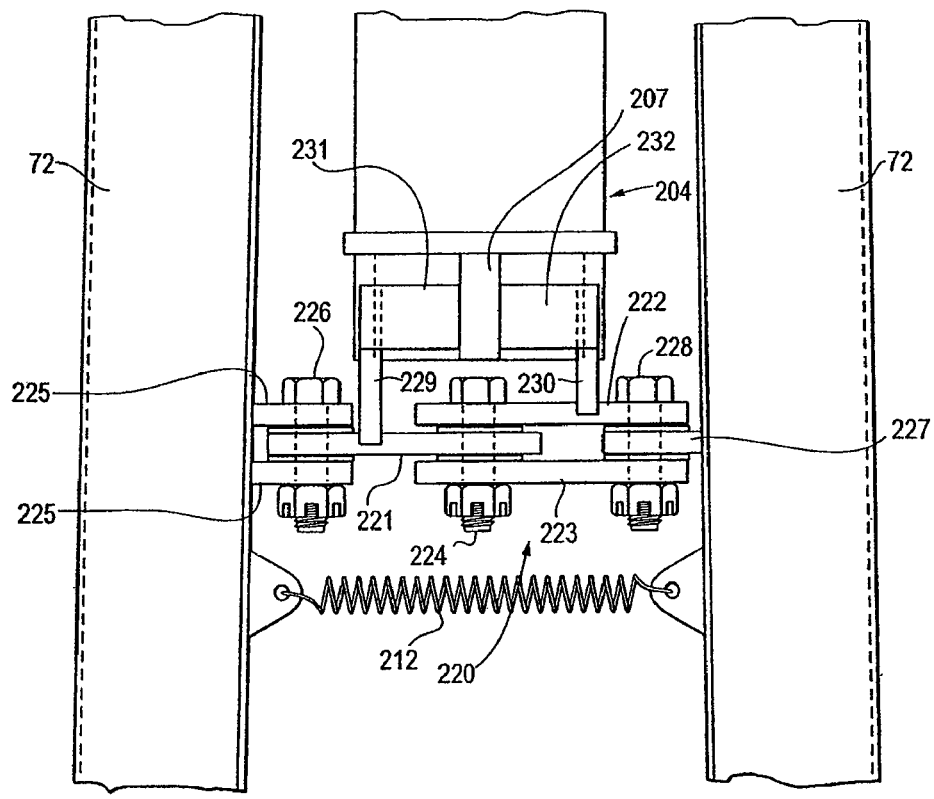
FIG. 15B is a side view of the preferred cam mechanism of FIG. 15A taken along line 15B.
Figure 15C:
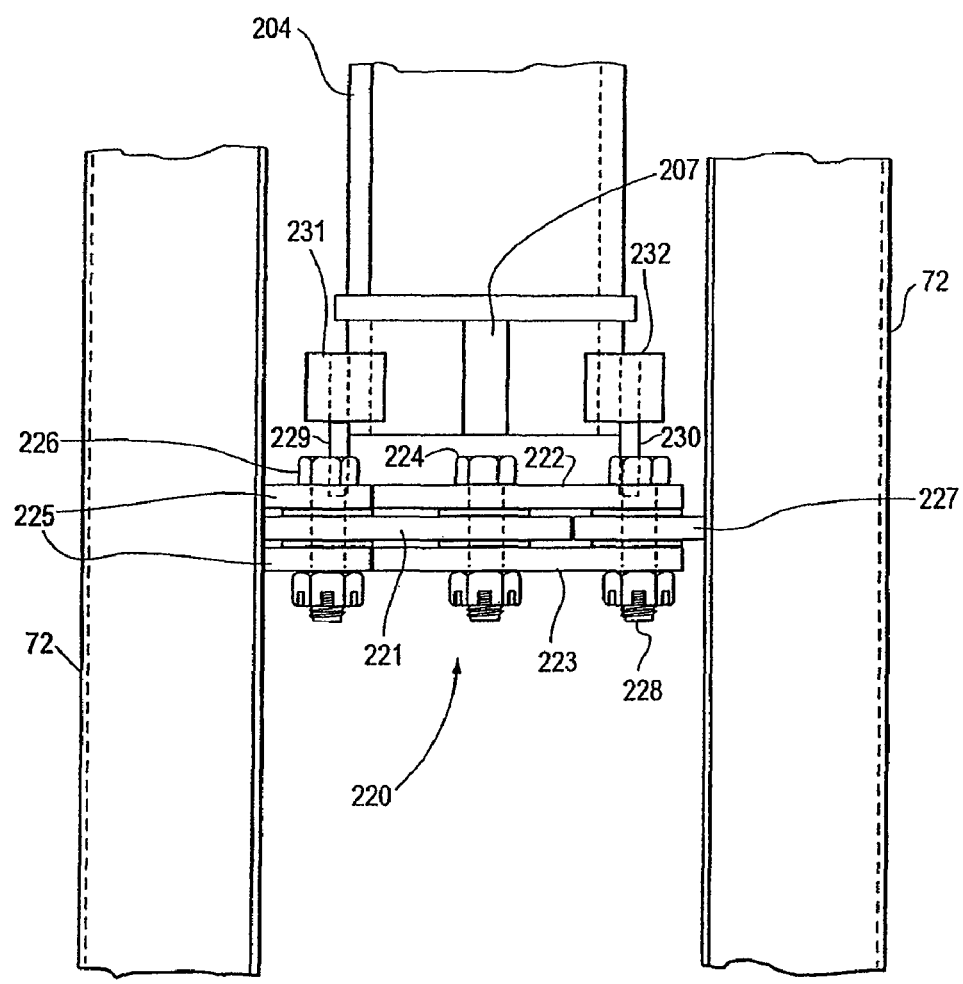
FIG. 15C is a side view of the preferred cam mechanism of FIG. 15A taken along line 15C shown with a pair of support arms in an engaged (backwashing) position.

A preferred embodiment of cam mechanism 220 is best shown in FIGS. 15A-15C. One side of preferred cam mechanism 220 includes a linkage 221 and the other side of cam mechanism 220 includes an upper linkage 222 and a lower linkage 223. As will be understood by those of skill in the art, upper and lower linkages 222 and 223 are provided to give the collective linkages stiffness, although only one linkage may be used, if desired. Similarly, linkage 221 may be more than one member, if desired. Linkage 221 is pivotably attached to one associated opposing support arm 72 through flanges 225 and a bolt and nut 226 or other well known means and which forms a pivot point. Linkages 222 and 223 are also pivotably attached to the other opposing support arm 72 through a flange 227 on support arm 72 with a bolt and nut 228 or other well known pivot forming means. Linkages 221, 222 and 223 are then pivotably connected to one another by a bolt and nut 224 or other well known pivot forming means at the center point between opposing control arms 72.

Linkage 221 and upper linkage 222 are provided with upstanding mechanical stops 229 and 230, respectively. Each stop 229 and 230 is provided with a locking tab 231 and 232, that is sized and positioned to engage guide stop 207 when the support arms 72 are in the disengaged or non-backwashing position as shown in FIGS. 15A and 15B, and the left in FIG. 14. It will be understood by those of ordinary skill in the art that upstanding mechanical stops 229 and 230, and their associated locking tabs 231 and 232, may take a variety of configurations consistent with the present inventions, including the preferred operation sequence as discussed herein.

The preferred operation of cam mechanism 220 and the associated pair of control arms 72 and backwash shoes 73 (not shown in FIG. 16) are schematically shown in FIG. 16. Cam mechanism 220 is selectively operated by a plunger assembly 240 that may include a piston 241 and spring 242 or other means to bias piston 241. One plunger assembly 240 is positioned at one end of basin 21 (FIGS. 1A and 2A) and another plunger 240 is positioned at the other end of basin 21. Plunger assemblies 240 are positioned so that pistons 241 associated with each plunger assembly 240 is able to engage cam mechanism 220 (preferably at center pin 224) when the traveling bridge assembly is at either end of the treatment basin 21. In this manner, the cam mechanism 220 may be pushed into an open position where support arms 72 are disengaged and spaced from cloth media support structure 40 at one end of basin 21 and cam mechanism 220 may be released so that support arms 72 are in the engaged position when the bridge structure 68 reaches the other end of basin 21.

Figure 2A:
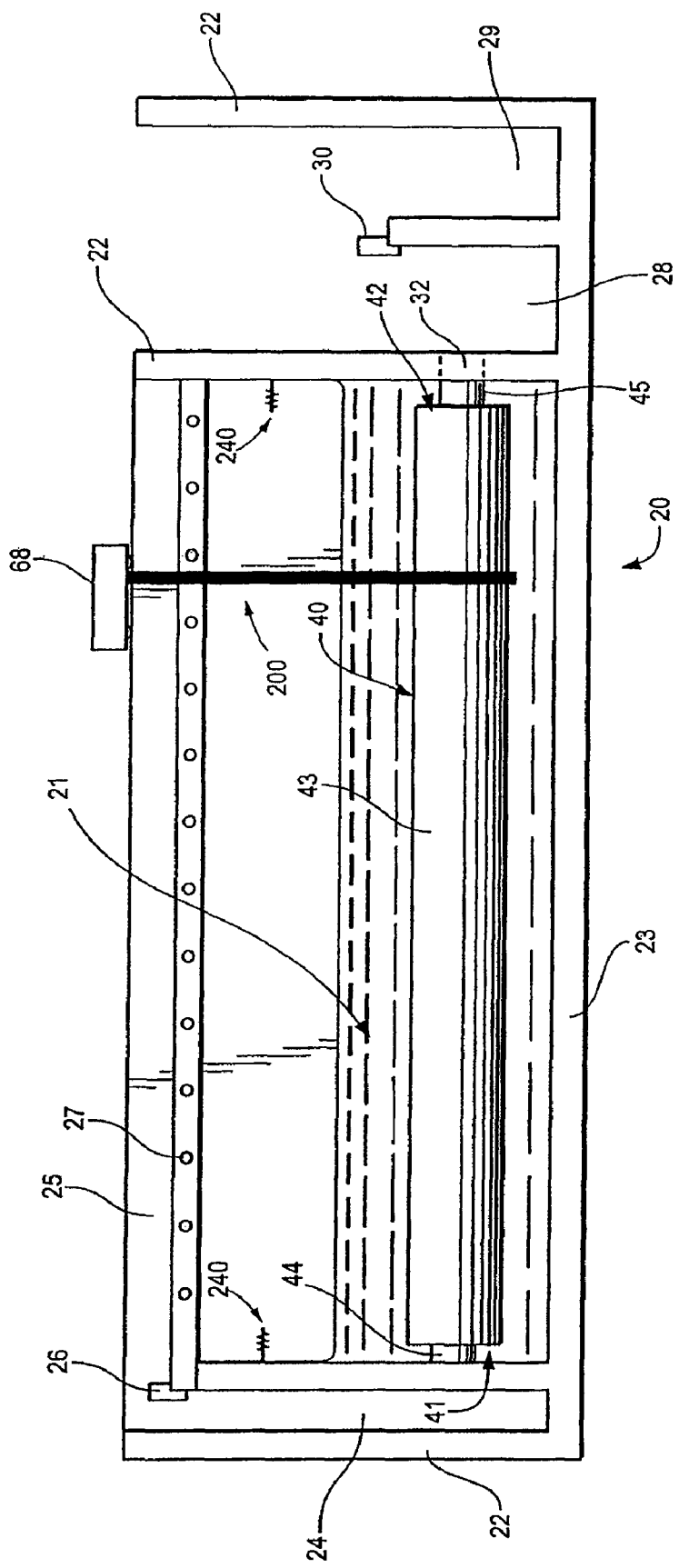
FIG. 2A is a schematic side elevational view of the preferred inventions of FIG. 1A, including a schematic representation of a self-aligning backwash assembly.
Figure 3:
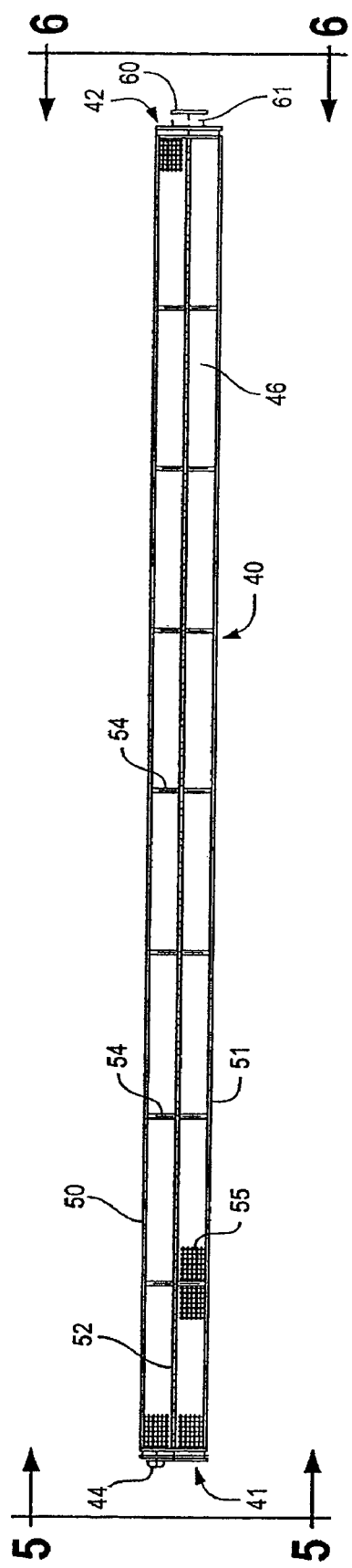
FIG. 3 is an elevational view of a preferred cloth filter media support structure of the present invention.

As shown in FIGS. 1A, 2A and 16, plunger assemblies 240 are positioned at either end of treatment basin 21, preferably along the centerline of the longitudinal axis of each cloth media support structure 40. FIG. 16 shows one pair of an associated pair of support arms 72 and cam mechanisms 220. As shown on the left of FIG. 16, control arms 72 are in an engaged position and backwashing may be conducted. Locking tabs 231 and 232 are not in contact with guide lock 207 and spring 212 forces support arms 72 together so that backwash shoes 73 are in contact with cloth filter media 43 as bridge assembly 67 travels towards the left in FIG. 16.

As bridge support structure 68 of traversing backwash assembly 67 reaches the left end of basin 21, as shown in FIG. 16, piston 241 of plunger assembly 240 engages cam mechanism 220, preferably at center pivot 224. When this occurs, linkages 221, 222 and 223 rotate away from piston 241 until locking tabs 231 and 232 of upstanding mechanical stops 229 and 230 contact guide stop 207 and control arms 72 are in the disengaged position as shown in FIGS. 15A and 15B and on the right side of FIG. 16. When in this open position of FIG. 15A, pivot points 226 and 228 are slightly out of horizontal alignment with pivot point 224 to ensure a stable open position as will be understood by those of skill in the art.

Conversely, as the support structure 68 travels in the other direction along the longitudinal axis of cloth media support structure 40 (towards the right side of FIG. 16), no backwashing is being conducted as support arms 72 are locked in a disengaged position. When the support structure 68 reaches the end of the basin 21, piston 241 of plunger assembly 240 contacts the opposite side of cam mechanism 220 at center pivot 224. Piston 224 forces linkages 221, 222 and 223 to rotate away from that plunger assembly 240 so that spring 212 then pulls the support arms 72 together into an engaged position permitting the backwashing operation.

As will be understood by those of skill in the art, two pairs of support arms 72 are associated with each hinged rocker cage 201 and one cam mechanism 220 is associated with each pair of cooperating support arms 72. In a preferred embodiment of self-aligning backwash assembly 200, cam mechanism 220 of each pair of support arms 72 are positioned in opposite directions so that, as shown in FIG. 14, as one set of control arms 72 is engaged and conducting the backwashing operation, the other associated pair of support arms 72 are locked in the disengaged or non-backwashing position. When the assembly reaches the end of the basin 21, activation of cam mechanism 220 by plunger assembly 240 reverses the process so that the other cloth media support structure 40 is backwashed.

As will also be understood, sufficient clearance of cloth filter media support structure 40 by backwash shoes 73 is required when in disengaged or non-backwash operation as traversing backwash system 67 travels in one direction along the longitudinal axis of cloth filter media support structure 40 and the other pair of backwash shoes 73 are conducting the backwash operation. As indicated, this is accomplished through, among other things, a four bar linkage structure of hinged rocker cage 201. Hinged rocker cage 201 includes a centering pivot point about pivot pin 210, which is designed to have enough system clearance to ensure that hinged rocker cage 201 is not locked from rotation. This centering pivot about pin 210 enables the guide stops 207 to remain in a substantially fixed horizontal orientation relative to the bridge structure 68. Thus, in a preferred embodiment, only one of two cloth media support structures 40 is cleaned in one direction and the other support structure cleaned in the other direction. And, hinged rocker cage 201 permits the backwashing pair of support arms 72 to be counter-balanced by the associated pair of non-backwashing support arms 72 and to account for any deviation as a result of the construction and installation of the various filtration system components.

In addition, in a preferred embodiment, plunger assembly 240 is spring loaded so that it may compensate for deviations of the length of travel of bridge structure 68 as well as placement of cam mechanism 220. It also provides for a soft-stop and activation. Plunger assemblies 240 may also be of differing lengths at different ends of treatment basin 21 to accommodate for optional offset placement along the longitudinal axis of cloth filter media support structure 40 of each of the associated pairs of support arms 72 so that one pair of support arms 72 do not interfere with the operation of the other associated pair of support arms 72 of a preferred embodiment.

Accordingly, a typical preferred embodiment of a cloth media filtration system 20 of the present invention includes at least one pair, and often several pairs, of cloth filter media support structures 40, arranged in parallel configurations and mounted within a treatment basin 21. A preferred self-aligning backwash assembly 200 of the present invention is arranged in pairs associated with each adjacent pair of cloth filter media support structures 40.

As indicated, it is preferred, but not required, to backwash one of the pair of adjacent cloth filter media support structures 40 in one direction of travel of the bridge support 68 along the length of treatment basin 21, and to backwash the other of the pair of cloth media support structures 40 in the other direction of travel of bridge support 68 along the length of treatment basin 21.

In this non-limiting manner of operation, the cooperating pair of self-aligning backwash assemblies 200, including the support arms 72 and backwash shoes 73, counter-balance one another. As one self-aligning backwash assembly 200 is conducting the cleaning operation, the non-cleaning self-aligning backwash assembly 200 of the associated pair floats or counter-balances the other cooperative assembly through hinged rocker cage 201 to help enable the self-aligning backwash assembly 200 that is backwashing to accommodate the various tolerances and/or deviations discussed. The opposite occurs when the bridge support 68 travel is reversed.

Of course, it will be understood by those of ordinary skill in the art that self-aligning backwash assembly 200 (as well as hinged rocker cage 201 and cam mechanism 220) may be constructed in a variety of configurations and materials as disclosed, discussed and/or claimed in this patent. Similarly, self-aligning backwash assembly 200 may be arranged by design to conduct the backwashing operation in any desired or appropriate sequence.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A method for treating water or wastewater by gravity using cloth filter media in a treatment basin having side walls and influent and effluent channels, including the steps of:
introducing water or wastewater for filtration into the treatment basin;
filtering the influent by gravity such that the influent flows through a stationary and substantially hollow cloth filter media support structure forming an effluent plenum which is positioned in the basin and to which is attached cloth filter media, said cloth filter media support structure having a length and two ends, one end being an open end mounted to and supported by a side wall of the treatment basin and in gravity flow fluid communication with an outlet of the treatment basin on a side wall of the treatment basin, and the other end supported by and mounted to an opposing side wall of the treatment basin, whereby the length of said support structure extends between opposing walls of the treatment basin and said support structure is fixed to and within said treatment basin; and, periodically cleaning said cloth filter media using a traversing backwash system including a self-aligning and linearly moving backwash assembly having backwash shoes external to said cloth filter media support structure for periodically cleaning said cloth filter media with suction, said self-aligning backwash assembly having a hinged rocker cage that is external to said cloth filter media support structure.

2. A method for filtering an influent of water or wastewater by gravity through cloth filter media comprising the steps of:

introducing the influent of water or wastewater into a filtration area of a filtration basin, the filtration basin having side walls;

filtering said influent through cloth filter media supported on at least one pair of stationary, elongated and substantially hollow cloth media support structures which form an effluent plenum, wherein each cloth media support structure has a length and two ends, one end supported by and attached to a side wall of the filtration basin and in fluid communication with an outlet of the filtration area, and the other end of each said support structure supported by and attached to the opposing side wall of the filtration basin;

discharging the filtered influent through said effluent plenum from the filtration area by gravity; and, periodically cleaning the cloth filter media with a traversing backwash system having a self-aligning and linearly moving backwash assembly with a backwash shoe and a hinged rocker cage external to said cloth media support structure, and a rotating cam mechanism.

3. The method of claim 2 including the step of controlling said periodic backwashing using a control system.

4. A method for the treatment of water or wastewater by gravity in a non-pressurized treatment basin having side walls, comprising:

introducing an influent of water or wastewater to be filtered into the treatment basin;

filtering the influent by gravity through at least one stationary and substantially hollow cloth filter media support means to support cloth filter media and also for forming effluent means for the discharge of filtered influent, said at least one stationary cloth filter media support means having a length, a cross-sectional shape and two ends, at least one of said ends is an open end in gravity flow fluid communication with an outlet of the treatment basin which is on a side wall of the treatment basin and the length of said at least one support means extends entirely between opposing walls of the treatment basin and wherein said at least one open end is mounted or attached to a side wall of the treatment basin and the other end of said support means is attached to and supported by the opposing side wall of the treatment basin;

periodically cleaning the cloth filter media on said cloth filter media support means with a traversing backwash means including linearly moving, self-aligning backwash means to compensate for deviations in the construction or installation of said cloth filter media support means; and controlling the traversing backwash means using a control means for regulating the periodic cleaning of the cloth filter media.

\* \* \* \* \*